United States Patent [19]
Matsunase et al.

[11] Patent Number: 5,502,090
[45] Date of Patent: Mar. 26, 1996

[54] HIGH TENACITY AND HIGH TOUGHNESS ACRYLIC SULFIDE FIBERS, A PROCESS FOR PRODUCTION THEREOF, AND COMPOSITE MATERIALS PREPARED BY USING IT

[75] Inventors: Takeo Matsunase; Takashi Takada, both of Shiga, Japan

[73] Assignee: Toray Industries, Inc., Tokyo, Japan

[21] Appl. No.: 412,563

[22] Filed: Sep. 25, 1989

Related U.S. Application Data

[63] Continuation of Ser. No. 134,075, Dec. 14, 1987, abandoned.

[30] Foreign Application Priority Data

| Apr. 14, 1986 | [JP] | Japan | 61-84334 |
| Apr. 14, 1986 | [JP] | Japan | 61-84335 |
| Jun. 30, 1986 | [JP] | Japan | 61-151680 |

[51] Int. Cl.$^6$ .............. C08J 7/12; C08J 5/14
[52] U.S. Cl. .......... 524/3; 52/309.17; 428/463; 523/152; 523/157; 524/3
[58] Field of Search .......... 524/2, 3, 13, 743; 523/149, 152, 157; 525/354; 428/442, 463

[56] References Cited

U.S. PATENT DOCUMENTS

| 2,563,662 | 6/1951 | Rothrock | 525/329.1 |
| 3,369,008 | 2/1968 | Hurwitz | 526/289 |
| 3,748,301 | 7/1973 | Kuhar | 523/149 |
| 4,113,847 | 9/1978 | Fukushima et al. | 423/447.4 |
| 4,265,628 | 5/1981 | Rossi | 525/354 |
| 4,306,911 | 12/1981 | Gordon | 106/99 |
| 4,414,031 | 11/1983 | Studinka | 106/99 |
| 4,654,381 | 3/1987 | Kang | 523/149 |
| 4,678,818 | 7/1987 | Nakagawa | 523/157 |

FOREIGN PATENT DOCUMENTS

| B1-24967/72 | 7/1972 | Japan . |
| B1-29932/72 | 8/1972 | Japan . |
| A-75119/76 | 6/1976 | Japan . |
| B1-19692/78 | 6/1978 | Japan . |
| B2-19491/79 | 7/1979 | Japan . |
| 1282500 | 7/1972 | United Kingdom . |

OTHER PUBLICATIONS

Condensed Chem Dict, Reinhold Co (NY), 1987, p. 19.
"Carbon Fiber", by Sugiro Ohtani et al., Jul. 1, 1983 (no translation provided).

*Primary Examiner*—Christopher Henderson
*Attorney, Agent, or Firm*—Foley & Lardner

[57] ABSTRACT

The present invention relates to acrylic sulfide fibers whose tensile strength is at least 3.5 g/d, toughness expressed by $TE^{1/2}$ product of tensile strength (T g/d) and a square root of tensile elongation (E %), is higher than 10 and sulfur content is higher than 0.5 weight %, a process for producing acrylic sulfide fibers characterized by heating acrylic fibers whose tensile strength is at least higher than 7 g/d in sulfur-containing atmosphere, and composite materials being reinforced with above described acrylic sulfide fibers.

Acrylic sulfide fibers obtained have high tenacity and high toughness as well as excellent heat resistance, anti-flammability and alkali resistance.

Therefore, above described acrylic sulfide fibers are useful for such applications as heat resistant and flame resistant spun-woven products, reinforcing cement cured in an autoclave and abrasive materials as asbestos substituting fibers.

16 Claims, No Drawings

HIGH TENACITY AND HIGH TOUGHNESS ACRYLIC SULFIDE FIBERS, A PROCESS FOR PRODUCTION THEREOF, AND COMPOSITE MATERIALS PREPARED BY USING IT

This application is a continuation of Ser. No. 134,075, filed Dec. 14, 1987, now abandoned which is a continuation of U.S. international application PCT/JP87/00219, filed Jan. 19, 1987.

TECHNOLOGICAL FIELD

The present invention relates to high tenacity acrylic sulfide fibers having excellent toughness, heat resistance, anti-flammability and alkali resistance and a process for production thereof.

The present invention also relates to acrylic sulfide fibers applicable for preparing heat resistant and flame resistant spun and woven products, abrasive materials and cement products cured in an autoclave and a process for production thereof.

BACKGROUND TECHNOLOGY

Asbestos has been widely used hitherto in such application fields where heat resistance, anti-flammability and alkali resistance are required as protective tools such as fire fighting clothes, working clothes before furnaces and sheets protecting welding sparks, sealing materials such as gaskets and ground packings, heat-shielding materials, filtering materials represented by bag filters, abrasive materials such as brakes and clutches, electric insulating materials and cement products cured in an autoclave.

However, it has been clarified that asbestos remarkably injures human health, for example, it causes cancer of the lung and the use of asbestos has been therefore becoming to be legally restricted or prohibited in many countries.

A variety of fibers such as carbon fiber, steel fiber, glass fiber, aramide fiber, phenolic fiber and flame resistant fiber (oxidized fiber) have been therefore proposed as the materials substituting for asbestos.

Among these substituting fibers, an acrylic oxidized fiber prepared by heating and oxidizing an acrylic fiber in air as being disclosed in the specifications of U.S. Pat. Nos. 3,508,874 and 3,961,888 most attracts notice because it has low density and excellent anti-flammability and it is flexible and relatively cheap. However, the acrylic oxidized fiber above described has an unhomogenuous structure where the degree of oxidation of the fiber skin layer is much larger than that of the core and therefore has low tensile strength and poor toughness. Spinning, weaving and knitting of the fiber is difficult and even if they can be done, abrasion resistance of the product thus obtained is poor. Heat resistance of the product is not good either and, for example, there was a problem that the strength decreases and the practical performance disappears when it is used at a higher temperature than 150° C. for a long time.

Therefore, sufficient performance could not be always obtained for such applications substituting for asbestos as heat resistant/flame resistant protective tools, packings, filters and electric insulating materials where heat resistance, flame resistance and abrasion resistance are required. A brake lining based on the above described acrylic oxidized fiber is proposed in the specification of U.S. Pat No. 4,259,397, but its abrasion resistance and heat resistance at higher temperature are poor and there are such problems in its practical performance that cracks occurs in the abrasive material during the usage and the durability is not always enough.

Moreover, high strength acrylic fibers and polyvinyl alcohol fibers are tried to use as reinforcing fibers for hydraulic materials such as cement, which is one of the main application fields of asbestos, but they do not endure a strong alkali at higher temperature in such a field that curing in an autoclave is carried out in steam at 180° C. and therefore completely lose their reinforcing effects. Acrylic oxidized fibers prepared by heating and oxidizing the above described acrylic fibers in air do not show improved alkali resistance at higher temperature either and they can not be therefore used for this application. Meanwhile, an acrylic sulfide fiber obtained by heating an acrylic fiber in sulfur dioxide is described in Japanese Patent Publication No. 36461/1972 (corresponding to BP 1,282,500) as an example of the methods for preparing special carbon fibers and it is described there that this sulfide fiber has a tensile strength higher than the acrylic fiber before sulfuration.

However, according to the results obtained by the present inventors when an acrylic fiber prepared of an acrylonitrile polymer having an ordinary degree of polymerization and containing a copolymerizing component used for manufacturing a conventional acrylic fiber such as, for example, acrylic acid, methacrylic acid, itaconic acid, methyl methacrylate and acrylamide, prepared by the same procedure as the example 1 in the above described publication, is heated and sulfurized in sulfur dioxide, the denier of the sulfurized fiber obtained increases due to the introduction of sulfur bonds. As the result, increase in the tensile strength can not be obtained and the tensile elongation remarkably decreases. The improvement of the toughness can not be expected either. It is therefore clarified that the problems related with spinning, weaving and knitting and abrasion resistance can not be solved by this method in a similar manner as the oxidized fiber obtained by heating and oxidizing the above described acrylic fiber in air. Therefore, the sulfide fiber described in this known example is only useful as an intermediate substance in manufacturing carbon fibers and the fiber satisfying the characteristics substituting for asbestos can not be obtained.

The present inventors have been intensively studying to improve these problems and thereby reached this invention.

DISCLOSURE OF INVENTION

The present invention relates to acrylic sulfide fibers whose tensile strength is at least 3.5 g/d, toughness expressed by $TE^{1/2}$ where T g/d and E % are tensile strength and tensile elongation respectively is higher than 10 and sulfur content is more than 0.5 weight %. The present invention also relates to a method for preparing the acrylic sulfide fibers characterized by heating acrylic fibers whose tensile strength is at least higher than 7 g/d in an atmosphere containing sulfur. The present invention also relates to composites materials reinforced with acrylic sulfide fibers, especially hydraulic substances cured in an autoclave and abrasive materials.

Acrylic sulfide fibers of the present invention contain cyclic structures containing sulfur bonds and cross-linking structure of sulfur. It is important in this invention that acrylic fibers are heated and sulfurized in a sulfur-containing atmosphere under a relatively mild reaction condition to prepare sulfide fibers where sulfur bonds are sufficiently indroduced into the inside of the fibers and structural difference between outer and inner layers is little. The sulfide fibers thus obtained in the present invention have high strength and excellent heat resistance, anti-flammability and alkali resistance and the fibers to be suitable for a variety of applications can be prepared by changing the acrylic fibers to be used and the reacting conditions in sulfur-containing atmosphere in various ways.

For example, for heat resistant and flame resistant spun and woven products to be used for protective tools, packings and filters requiring heat resistance and anti-flammability, it is preferable that the sulfur content in the fibers is above 5 weight %, more preferably 8 to 25 weight %, the tensile strength is higher than 3.5 g/d, more preferably 4 to 9 g/d and the toughness expressed by the product $TE^{1/2}$ of tensile strength (T g/d) and tensile elongation (E %) is higher than 10, more preferably 12 to 35. In this case, if the sulfur content is lower than 5 weight %, not only anti-flammability but also such characteristics as heat resistance, chemical resistance and etc. can not be sufficiently obtained. In order to give much higher anti-flammability to the sulfide fibers of the present invention, it is desirable that the limiting oxygen index (LOI) of the sulfide fibers is higher than 40, preferably 45 to 70.

Moreover, if the tensile strength is lower than 3.5 g/d and the toughness is smaller than 10, flying stuff easily occurs and good products such as yarns and fabrics can not be obtained when products such as yarns and fabrics are prepared by spinning, weaving and knitting the sulfide fibers. When these products are used, the sulfide fibers abrade and drop out and the durability becomes poor. As the result, the practical performance is not sufficient.

When the sulfide fibers of the present invention are used as abrasive materials, it is desirable that the sulfur content is higher than 3 weight %, preferably higher than 5 weight %. If the sulfur content is under 3 weight %, it is not desirable because the heat resistance of the fibers decreases and it is not expected that durability and abrasion resistance as the abrasive materials are remarkably improved.

When the sulfide fibers of the present invention are used for reinforcing materials of hydraulic inorganic products such as cement cured in high temperature steam in an autoclave, it is necessary that the tensile strength is higher than 3.5 g/d, preferably higher than 4.5 g/d and the sulfur content is higher than 0.5 weight % and lower than 20 weight %, preferably higher than 1 weight % and lower than 15 weight %.

If the sulfur content is lower than 0.5 weight %, alkali resistance of the reinforcing fibers decreases and tensile strength of the fibers decreases by steam-curing at higher temperature to loose reinforcing effect to hydraulic inorganic products. On the other hand, if the sulfur content is too high, tensile strength of the reinforcing fibers decreases.

Next, the method for preparing sulfide fibers of the present invention is described. As the acrylic fibers used for sulfuration, possibly highest strength/highest elastic modulus acrylic fibers prepared by using a polymer of high degree of polymerization whose degree of polymerization expressed by intrinsic viscosity is at least 1.5, preferably 2.0 to 5.0 and whose tensile strength is at least higher than 7 g/d, preferably higher than 9 g/d, more preferably higher than 10 g/d, should be used.

Until heating and sulfurizing the above described high strength acrylic fibers in a sulfur-containing atmosphere, sulfide fibers of the present invention having high strength and excellent toughness can not be obtained. When heated and oxidized in air as in the former cases, oxidized fibers having high strength and excellent toughness can not be obtained even if high strength acrylic fibers are used. For example, it is described in the specification of U.S. Pat. No. 3,508,874 that oxidized fiber whose tensile strength is 1.3 g/d is obtained by heating and oxidizing acrylic fibers whose tensile strength is 4.8 g/d. As is described in the specification of U.S. Pat. No. 3,961,888, even if high strength acrylic fibers whose tensile strength is 8.08 g/d is heated in an oxygen atmosphere, oxidized fibers obtained is non-flammable but the tensile strength is only about 2.44 g/d. No description on their values of elongation is found in either patent specification, but presumably the elongation is very small and the toughness is poor. As described above, it is a well known fact that oxidized fibers having high strength and excellent toughness can not be obtained by the conventional technology where acrylic fibers are heated and oxidized in air even if high strength acrylic fibers are used. The significance of the present invention is therefore to find the fact that sulfide fibers having high strength and excellent toughness can be obtained when high strength acrylic fibers are used for heating and sulfurizing acrylic fibers in a sulfur-containing atmosphere.

In the present invention, as the acrylonitrile (hereinafter abbreviated as AN) polymer comprising the acrylic fibers used in the present invention, AN homopolymer or a copolymer of AN of at least 95 mole % and a monomer copolymerizable with AN, of less than 5 mole %, for example, carboxylic acid such as acrylic acid, methacrylic acid, itaconic acid and its lower alkyl ester derivatives, hydroxyalkyl acrylates or methacrylates having a hdroxyalkyl caroxyl group such as hydroxymethylacrylate, hydroxyethylacrylate, hydroxymethylmethacrylate, acrylamide, methacrylamide, -chloroacrylonitrile, methacrylonitrile, hydroxyethylacrylic acid, acryl sulfonic acid and methacryl sulfonic acid.

These AN polymers are dissolved in an organic solvent such as dimethyl sulfoxide (DMSO), dimethyl acetamide (DMAC) and dimethyl formamide (DMF) or a concentrated aqueous solution of an inorganic salt such as calcium chloride, zinc chloride and sodium thiocyanate, or an inorganic solvent such as nitric acid to prepare a spinning solution whose polymer concentration is 5 to 20%, from which fibers whose denier is 0.5 to 7 denier (d), preferably 1 to 5 d are prepared by means of a wet, dry or dry-wet spinning process, preferably a dry-wet spinning process. It is especially desirable that a DMSO solution of an AN polymer of high degree of polymerization whose intrinsic viscosity is higher than 2.5 is guided to a coagulation bath through holes of a spinning nozzle set at 1 to 20 mm above the liquid surface of the coagulation bath, preferably 3 to 10 mm by means of a dry-wet spinning process and coagulated filaments obtained are then washed, desolvated, drawn for the first drawing step, dried and densified by means of a conventional process and are thereafter drawn by more than 1.1 times, preferably more than 1.5 times to get the total drawing ratio of at least 10 times, preferably more than 12 times, and as the result, acrylic fiber of dense and little inner/outer structural difference having tensile strength of at least 10 g/d, tensile modulus of higher than 180 g/d, knot strength of higher than 2.2 g/d and X-ray crystalline orientation of higher than 93% are prepared.

Acrylic fibers thus obtained are heated and sulfurized in a sulfur-containing atmosphere, for example, carbon disulfide, hydrogen sulfide, sulfur dioxide and sulfur vapour or the mixture thereof. Among them, sulfur dioxide is preferably used as sulfur dioxide can introduce homogeneously sulfur into the fiber cross-sectional direction and fibers without a double layers structure can be thereby prepared with good reproducibility. It is preferable that the heating temperature is in the range of 230° to 400° C.

When the above described acrylic fibers are heated in sulfur dioxide atmosphere, sulfuration reaction is relatively mild in comparison with the conventional oxidation reaction in an oxidizing atmosphere such as air and sulfur dioxide smoothly diffuses into the fibers. As the result, sulfide fibers where sulfur atoms homogeneously distribute in whole fiber cross-sectional area and having a fiber structure without inner outer structural difference can be prepared.

Moreover, in the above described sulfur containing atmosphere, especially sulfur dioxide atmosphere, a heating atmosphere mixed properly with another gas such as nitrogen and oxygen can be used. Especially, the mixed gas of sulfur dioxide with nitrogen is effective to react efficiently the fibers with sulfur dioxide. The heating in this sulfuration process can be done either at a constant temperature condition or under elevating temperature. For example, the first heating step can be done in a heating oven kept in a temperature range of 230° to 280° C. and the second heating step in a temperature range of 280° to 400° C. respectively. The sulfuration can be done in a heating oven set at this stepwise temperature elevating condition. When acrylic fibers are heated and sulfurized, they can be heated under either relaxed, stretched or constant length condition, a tensile force as high as possible, for example, at least higher than 0.3 g/d is preferable to obtain a sulfide fibers having high tensile strength. On the other hand, relaxed condition is desirable to enlarge tensile elongation and to improve toughness.

The acrylic sulfide fibers of the present invention thus obtained have high strength and remarkably excellent toughness, heat resistance, anti-flammability and alkali resistance and show the same spinability as those of the ordinary fibers for clothes. It is easy to treat the fibers into yarns, fabrics and other fiber products and the fibers have good processability. They can be therefore widely used in such applications for asbestos substituting fibers as reinforcing materials of cement cured in an autoclave, abrasive materials, ground packings, gaskets, electric insulation papers, fire fighting clothes, and protective sheets for welding sparks and the industrial significance is very large.

Here, examples where sulfide fibers of the present invention are applied for reinforcement of cement cured in an autoclave and abrasive materials are described.

At first, in case of reinforcement of cement cured in an autoclave, sulfide fibers of the present invention used as reinforcing fibers are cut into the length of 0.5 to 15 mm and the cut fibers are blended with a hydraulic inorganic substance such as cement. The amount of blending is 0.1 to 10 weight % against weight of the blended composition, preferably in a range of 0.5 to 5 weight % and a stable and sufficient reinforcing effect on the hydraulic inorganic substance can be obtained within this blending range.

As the hydraulic inorganic substances, inorganic substances having hydraulic property such as calcareous and siliceous substances, for example, silica, diatomaceous earth, blast furnace slag, fly ash, lime, plaster and a variety of cements such as Portland cement can be listed.

Of course, in order to give a porous property to the fiber reinforced hydraulic inorganic products and to make them light weight, perlite, siliceous balloon and glass balloon can be suitably mixed with them. Moreover, to improve pulping property of the slurry below described and flow property of the paste, wood pulp, fibrile fibers prepared of acrylic fibers and aromatic polyamide fibers, inorganic fibers and other fillers can be added and blended.

Slurry or past-like blended compound where these reinforcing fibers of the present invention are blended with the above described hydraulic inorganic substances can be formed into desired shapes. For example, so-called Hacheck method where a slurry obtained is made into a desired shape or a molding method where a blended compound of a paste of a hydraulic inorganic substance with the reinforcing fibers is poured in a mold to mold a desired shape can be applied.

The molding thus obtained is usually put into an autoclave and cured with steam at 180° C. but it is no problem that either the temperature condition above 180° C. or that at 110° to 180° C. can be applied.

As the time for steam curing, it depends on the curing temperature but the range of 3 to 15 hours is preferable.

Next, when applied to abrasive materials, sulfide fibers of the present invention used for reinforcing fibers are cut into 1 to 10 mm in length. The cut fibers are mixed with a matrix resin and other additives and the mixture are molded to prepare abrasive materials. As the reinforcing fibers, not only the above described cut fibers but also a variety of fabrics prepared of long fibers such as filaments and spun yarns can be used as base fabrics of the abrasive materials. Non-woven fabrics are prepared of long or short filaments and the non-woven fabrics can be used as the base materials of the abrasive materials.

As the matrix resins, no limitation exists but resins having excellent heat resistance and abrasive characteristics such as phenolic resin, epoxy resin, polyimide resin, aromatic polyester resin, sulfur-containing heat resistant resin can be used.

As the additives, a variety of fibers having heat resistance such as aramide fiber, carbon fiber, steel fiber, glass fiber, phenolic fiber, polyimide fiber and asbestos are given as the examples. To improve abrasive characteristics, a variety of inorganic and organic fillers such as graphite, silica powder, alumina powder, barium sulfate, metal powder, mica, clay, calcium carbonate, molybdenum disulfide, barite, cashew dust and rubber dust can be also blended.

As the sulfide fibers of the present invention contain sulfur, the adhesive property to matrix resin is excellent and the amount of blending of the matrix resin can be therefore reduced. The matrix resin in the abrasive material has a roll of an adhesive for fibers and fillers and as the amount of the matrix resin increases, heat resistance of the abrasive material usually decreases. Therefore, to be able to reduce the amount of the matrix resin is effective to improve heat resistance of the abrasive material. These abrasive materials are very useful for not only automotive disk pads, brake lining materials and clutches but also abrasive materials in general industrial applications.

Now, the effect of the present invention will be furthermore described in detail in connection with the following examples, but it is not limited by these examples.

Meanwhile, the values of intrinsic viscosity of polymers, tensile strength and elongation, heat resistance, limiting oxygen index and alkali resistance of fibers are measured by the following methods of measurement.

Intrinsic viscosity: 75 mg of dried AN polymer are put in a flask and 25 ml of DMF containing 0.1N sodium thiocyanate are therein added to dissolve completely AN polymer. The relative viscosity of the polymer solution thus obtained is measured at 20° C. by using an Ostwald's viscometer. The intrinsic viscosity is calculated by the following equation.

Intrinsic viscosity = $[(1 + 1.32 \times \text{(relative viscosity)}^{1/2} - 1]/0.198$ Tensile strength and elongation: They are measured by the measuring method defined in JIS-L-1069.

Heat resistance: Heat resistance is expressed by tenacity retention rate (%) after heating the sample fibers under relaxed condition at 180° C. in air for 10 days.

Limiting oxygen index (LOI): This value is measured by the measuring method defined in JIS-K-7201 and the method is described more concretely as follows.

About 1 g of the sample to be measured is wound on a wire (a supporting body) whose diameter is about 1 mm to make a cord-like material whose diameter is about 4 mm, which is set on a frame whose length is 150 mm. This is thereafter set in a burning cylinder, through which a mixed gas of oxygen and nitrogen is passed at a flow rate of 11.4 l/min for about 30 seconds and the upper edge of the sample is thereafter ignited and the minimum amount of oxygen flow (A) and the amount of nitrogen flow (B) at the same time to be necessary for continuously firing the sample for more than 3 minutes or for continuously firing the sample to the burned length of more than 50 mm are determined. The ratio of oxygen flow to the total amount of the mixed gas flow is LOI, which can be expressed by the following equation.

$$LOI = (A/(A+B)) \times 100$$

Alkali resistance: The sample fibers are immersed in the head transparent part of cement 5 weight % aqueous solution under relaxed state and the tensile tenacity is measured after 6 hours immersion. Tenacity retention rate (%) is calculated by using the tensile tenacity of the fibers before and after treating in the above described cement head transparent solution and alkali resistance is expressed by this value.

EXAMPLES 1 TO 6 AND COMPARISON EXAMPLES 1 TO 5

99.7 mole % of AN and 0.3 mole % of itaconic acid were solution polymerized in DMSO and AN polymers having various intrinsic viscosities shown in Table 1 were thereby prepared. Wet spinning and dry-wet spinning were carried out respectively by using the polymer solutions thus obtained as the spinning solution. In all cases, DMSO 55% aqueous solution was used as the coagulation bath. In case of the dry-wet spinning, the distance between the spinning nozzle and the liquid surface of the coagulation bath was set at 5 mm and the distance from the liquid surface of the coagulation bath to the fiber bundle gathering guide was set at 400 mm.

Undrawn filaments obtained were drawn by 5 times in hot water, washed with water and secondly drawn after imparting oil by 90% of the maximum drawn ratio in a dry heating tube at 180° to 200° C. to obtain acrylic fibers shown in Table 1.

TABLE 1

| Type of acrylic fiber | Intrinsic viscosity of polymer | Spinning process | Fiber properties | | | |
| --- | --- | --- | --- | --- | --- | --- |
| | | | Denier (d) | Tensile strength (g/d) | Tensile elongation (%) | Tensile modulus (g/d) |
| A | 1.2 | Wet | 1.5 | 4.7 | 10.9 | 72 |
| B | 1.7 | Wet | 1.0 | 7.1 | 12.2 | 133 |
| C | 1.7 | Dry-wet | 0.8 | 11.5 | 15.2 | 178 |
| D | 3.1 | Dry-wet | 1.2 | 13.3 | 12.3 | 200 |

Acrylic fibers shown in Table 1 were then sulfurized or oxidized in sulfur dioxide ($SO_2$) or in air respectively under various reaction conditions. Tensile strength, toughness, heat resistance and antiflammability (LOI) of the sulfide or oxidized fibers obtained were measured. Crimp was given to these fibers and the crimped fibers were cut into 120 mm in length and the spinnabilities of the cut crimped fibers were evaluated by using a model spinning machine. These results are shown in Table 2.

Table 2 shows that the higher the strengths of acrylic fibers before sulfuration are, the higher the strength and toughness of the sulfide fibers of the present invention keep. On the other hand, in case of the oxidized fibers obtained by heating in air, fibers having low tensile strength and poor toughness were only obtained even if the strengths of acrylic fibers before oxidation are high.

Moreover, as the sulfur content by sulfuration increases, heat resistance and anti-flammability of sulfide fibers obtained are improved. When fibers of low toughness were used, the spinnability is poor and spun yarns of good quality could not be obtained.

TABLE 2

| Example (E) or comparison example (C) | Type of acrylic fiber | Reaction condition | | | Fiber property | | | | | Spinnability of fibers |
|---|---|---|---|---|---|---|---|---|---|---|
| | | Type of gas | Temperature × Time (°C.) × (hr) | State of tension (g/d) | Sulfur content (weight %) | Tensile strength (g/d) | Toughness (g/d) × (%)$^{1/2}$ | Heat resistance (%) | LDI | |
| E1 | B | $SO_2$ | 280 × 2 | Constant length | 11 | 5.2 | 14 | 33 | 45 | Good |
| E2 | C | $SO_2$ | 280 × 2 | Constant length | 11 | 6.5 | 20 | 31 | 47 | Good |
| E3 | D | $SO_2$ | 280 × 2 | Constant length | 12 | 7.3 | 24 | 35 | 46 | Good |
| C1 | A | $SO_2$ | 280 × 2 | Constant length | 12 | 4.0 | 8 | 38 | 44 | Poor |
| C2 | A | Air | 250 × 1.5 | Constant length | 0 | 1.9 | 5 | 12 | 48 | Poor |
| C3 | D | Air | 250 × 1.5 | Constant length | 0 | 2.7 | 8 | 13 | 51 | Poor |
| E4 | C | $SO_2$ | 370 × 0.5 | 0.3 | 22 | 4.1 | 11 | 51 | 70 | Good |
| E5 | D | $SO_2$ | 340 × 0.5 | Relaxed | 20 | 4.2 | 16 | 80 | 70 | Good |
| E6 | C | $SO_2$ | 280 × 1 | 0.3 | 6 | 6.6 | 25 | 22 | 27 | Good |
| C4 | B | $SO_2$ | 310 × 1 | Relaxed | 19 | 3.3 | 9 | 55 | 70 | Poor |
| C5 | A | $SO_2$ | 295 × 1.5 | Constant length | 19 | 3.9 | 7 | 70 | 70 | Poor |

EXAMPLES 7 TO 14 AND COMPARISON EXAMPLES 6 TO 7

Acrylic fibers B, C and D were sulfurized and oxidized respectively under reaction conditions shown in Table 3. The fiber having properties shown in Table 3 were thereby obtained.

The fibers thus obtained were cut by 5 mm in length and a compound comprising 10 g of the cut fibers shown in Table 3, 10 g of wood pulp, 10 g of $Ca(OH)_2$, 10 g of $Al_2(SO_4)_3$ and 10 of water was prepared. After stirring it, 460 g of Portland cement were added to it and the mixture was stirred again. 200 ppm of anionic polyacrylamide polymer coagulating agent were then added thereto under low speed stirring to prepare a cement slurry, which was then transferred to a mold where a wirenet of 50 mesh was placed, filtered through the wirenet and pressed under pressure of 100 kg/cm$^2$ for one minute to mold a green sheet of about 6 mm in thickness. After curing this green sheet in water at 70° C. for 15 hours, it was transferred in an autoclave, where it was steam-cured at 180° C. for 5 hours to obtain a cement plate whose density was 1.6. Test pieces were cut out from this cement plate and the bending strengths under wet state were measured. The results obtained are shown in Table 3.

It is found that sulfide fibers of the present invention not only have superior tensile strength and alkali resistance to those of the oxidized fibers obtained by heating and

TABLE 3

| Example (E) or comparison example (C) | Type of acrylic fiber | Reaction condition | | | Fiber property | | | | Property of cement plate |
|---|---|---|---|---|---|---|---|---|---|
| | | Type of gas | Temperature × Time (°C.) × (hr) | State of tension (g/d) | Sulfur content (weight %) | Tensile strength (g/d) | Toughness (g/d) × (%)$^{1/2}$ | Alkali resistance (%) | Bending strength (kg/cm$^2$) |
| E7 | C | $SO_2$ | 250 × 0.5 | 0.3 | 1 | 10.0 | 35 | 52 | 160 |
| E8 | C | $SO_2$ | 260 × 1 | 0.3 | 3 | 9.0 | 31 | 75 | 175 |
| E9 | C | $SO_2$ | 280 × 1 | 0.3 | 5 | 8.0 | 26 | 86 | 182 |
| E10 | C | $SO_2$ | 295 × 1 | 0.3 | 16 | 5.5 | 16 | 75 | 155 |
| E11 | C | $SO_2$ | 340 × 1 | 0.3 | 20 | 4.6 | 12 | 53 | 150 |
| C6 | C | Air | 250 × 2 | 0.3 | 0 | 2.6 | 8 | 0 | 130 |
| C7 | C | Unreacted | | | 0 | 11.5 | 45 | 0 | 137 |
| E12 | B | $SO_2$ | 280 × 2 | Constant length | 11 | 5.2 | 14 | 80 | 162 |
| E13 | C | $SO_2$ | 280 × 2 | Constant length | 11 | 6.5 | 20 | 85 | 170 |
| E14 | D | $SO_2$ | 280 × 2 | Constant length | 12 | 7.3 | 24 | 95 | 185 | oxidizing in air but also clearly have excellent reinforcing effect on the cement plate obtained by curing in an autoclave.

Especially when acrylic fibers obtained from AN polymers of high degree of polymerization were used, sulfide fibers obtained had high tensile strength and alkali resistance and the reinforcing effect on cement could be remarkably improved.

EXAMPLE 15 AND COMPARISON EXAMPLE 8 TO 10

Acrylic fibers D were sulfurized and oxidized respectively under the reaction conditions shown in Table 4 to obtain fibers having properties shown in Table 4.

These fibers were cut by about 1 mm in length and the fibers, a phenolic resin and $CaCO_3$ filler were mixed with a volume ratio of 57:25:18. The blend was put in a mold and hot-pressed under the condition of 180° C. and 200 kg/cm² to mold. The surface of the molding obtained was grinded, polished with No. 600 sandpaper with water, washed with water and dried to prepare and abrasive material. Abrasive coefficient and the amount of abrasion of the plate-shaped abrasive material obtained were measured by means of the Suzuki-type abrasion tester under loading of 10 kg/cm², circular speed of 100 m/min and temperature of 250° and 300° C. The relative values of these measurements, when the amount of abrasion for the present material, that is, asbestos was set 100, were shown in Table 4.

Depending on high strength and excellent heat resistance of the reinforcing fibers, the abrasive materials where the sulfide fibers of the present invention were used as the reinforcing materials showed lower amount of abrasion and were superior in coparison with the abrasive material using asbestor or conventional oxidized fibers.

TABLE 4

| Example (E) of comparison example (C) | Type of acrylic fiber | Reaction condition | | | Fiber property | | | |
|---|---|---|---|---|---|---|---|---|
| | | Type of gas | Temperature × Time (°C.) × (hr) | State of tension | Sulfur Content (Weight %) | Tensile strength (g/d) | Toughness (g/d) × (%)^{1/2} | Heat resistance |
| E15 | D | $SO_2$ | 300 × 0.7 | 0.3 | 15 | 5.4 | 15 | 61 |
| C8 | D | | unreacted | | 0 | 13.3 | 47 | 9 |
| C9 | D | Air | 250 × 2 | 0.3 | 0 | 2.6 | 8 | 13 |
| C10 | Asbestos | — | | | — | — | — | — |

| Example (E) of comparison example (C) | Temperature (°C.) | Abrasive coefficient | Amount of abrasion (Relative value) | State of abrasion |
|---|---|---|---|---|
| E15 | 250 | 0.27 | 20 | |
| | 350 | 0.29 | 21 | |
| C8 | 250 | — | — | Could not be measured as melting due to heating occurred |
| | 350 | — | — | |
| C9 | 250 | 0.27 | 39 | Cracks occurred |
| | 350 | 0.33 | 53 | Large sound of abrasion |
| C10 | 250 | 0.40 | 100 | |
| | 350 | 0.44 | 100 | |

We claim:

1. Composite materials being reinforced with non-carbonized organic acrylic sulfide fibers.

2. Composite materials as claimed in claim 1, wherein said composite materials are hydraulic substances cured under wet and heated state.

3. Composite materials as claimed in claim 1 wherein said composite materials are friction elements.

4. Composite materials as claimed in claim 3, wherein the organic acrylic sulfide fibers have a sulfur content higher than 3 weight %.

5. Composite material as claimed in claim 1, wherein the non-carbonized organic acrylic sulfide fibers are made from acrylic fibers of a copolymer of acrylonitrile of at least 95 mole % and an acrylic monomer having an amide group.

6. Composite material as claimed in claim 1, wherein the non-carbonized organic acrylic sulfide fibers are made from acrylic fibers of a copolymer of acrylonitrile of at least 95 mole % and acrylamide.

7. Composite material as claimed in claim 2, wherein the sulfur content of the non-carbonized organic acrylic sulfide fibers is from about 0.5 to 20 wt %.

8. Composite material as claimed in claim 2, wherein the non-carbonized organic acrylic sulfide fibers have a length of from about 0.5 to 10 mm.

9. Composite material as claimed in claim 2, comprising about 0.5 to 10 wt % of the non-carbonized organic acrylic sulfide fibers.

10. Composite material as claimed in claim 2, comprising about 0.5 to 5 wt % of the non-carbonized organic acrylic sulfide fibers.

11. Composite material as claimed in claim 2, comprising pulp.

12. Composite material as claimed in claim 2, wherein the hydraulic substance is cement.

13. Composite material as claimed in claim 2, wherein the hydraulic substance is cement cured in an autoclave.

14. Composite material as claimed in claim 2, wherein the non-carbonized organic acrylic sulfide fibers have a tensile strength higher than 3.5 g/d and a sulfur content of 0.5 to 20 wt %.

15. In a composite material, the improvement comprising reinforcing the composite with non-carbonized organic acrylic sulfide polymer fibers.

16. In a composite hydraulic substance, the improvement comprising non-carbonized organic acrylic sulfide polymer fibers as a reinforcing agent.

* * * * *